United States Patent
Takaoka et al.

(10) Patent No.: US 6,867,509 B1
(45) Date of Patent: Mar. 15, 2005

(54) CONTROL APPARATUS FOR TRANSMISSION-EQUIPPED HYBRID VEHICLE, AND CONTROL METHOD FOR THE SAME

(75) Inventors: Toshifumi Takaoka, Susono (JP); Naoto Suzuki, Fuji (JP); Takashi Suzuki, Susono (JP); Daimon Okada, Ikeda (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 170 days.

(21) Appl. No.: 09/694,021

(22) Filed: Oct. 23, 2000

(30) Foreign Application Priority Data

Nov. 19, 1999 (JP) .................................... HEI 11-329078

(51) Int. Cl.$^7$ ............................................. B60K 26/00
(52) U.S. Cl. .................................. 290/40 A; 180/65.2
(58) Field of Search ...................... 290/40 A; 180/65.2

(56) References Cited

U.S. PATENT DOCUMENTS

| | | | |
|---|---|---|---|
| 5,327,992 A | | 7/1994 | Boll ........................... 180/65.2 |
| 5,495,912 A | | 3/1996 | Gray, Jr. et al. |
| 5,562,566 A | | 10/1996 | Yang |
| 5,720,690 A | * | 2/1998 | Hara et al. ................. 180/65.2 |
| 5,788,004 A | | 8/1998 | Friedmann et al. |
| 5,789,882 A | * | 8/1998 | Ibaraki et al. ............. 180/65.3 |
| 5,841,201 A | * | 11/1998 | Tabata et al. .............. 180/65.4 |
| 5,842,534 A | * | 12/1998 | Frank ......................... 180/65.2 |
| 5,846,155 A | * | 12/1998 | Taniguchi et al. ............. 477/2 |
| 5,942,879 A | * | 8/1999 | Ibaraki ....................... 180/65.2 |
| 5,943,918 A | * | 8/1999 | Reed et al. ................ 192/219.5 |
| 5,959,420 A | * | 9/1999 | Boberg et al. .............. 180/282 |
| 5,993,350 A | * | 11/1999 | Lawrie et al. ............. 180/65.2 |
| 6,006,620 A | * | 12/1999 | Lawrie et al. ................ 74/335 |
| 6,367,570 B1 | | 4/2002 | Long, III et al. |
| RE37,743 E | | 6/2002 | Yang |

FOREIGN PATENT DOCUMENTS

| | | | |
|---|---|---|---|
| DE | 4324010 | * 1/1995 | ........... B60K/41/28 |
| EP | 0 806 316 A | 11/1997 | |
| EP | 0 970 838 A | 1/2000 | |
| JP | 6-48222 | 2/1994 | |
| JP | 8-168104 | 6/1996 | |
| JP | 9-9407 A | 1/1997 | |
| JP | 9-37411 A | 2/1997 | |
| JP | 11-4506 A | 1/1999 | |
| JP | 10-23608 A | 1/1999 | |
| JP | 11-180173 A | 7/1999 | |

* cited by examiner

Primary Examiner—Joseph Waks
(74) Attorney, Agent, or Firm—Oliff & Berridge, PLC

(57) ABSTRACT

The priority sequence in a control of adjusting the drive power with respect to a vehicle drive power request is set in the sequence of: (1) an engine output increase, (2) a motor output increase, and (3) a gear speed change in a gear ratio increasing direction. More specifically, a gear speed of a least gear ratio is selected within such a range that an engine revolution speed higher than or equal to a predetermined lower limit revolution speed is attainable. A requested drive power is achieved singly by an engine output with the gear speed selected. When the requested drive power is not achievable singly by the engine output, the requested drive power is achieved by the engine output and a motor output. When the requested drive power is not achievable by the engine output and the motor output, the gear speed is changed in a gear ratio increasing direction.

5 Claims, 6 Drawing Sheets

Pa: REQUESTED DRIVE POWER 1

Pb: ENGINE OPERATION REGION IS OPTIMIZED BY MG REGENERATION

Pc: REQUESTED DRIVE POWER 2

Pb: ENGINE OPERATION REGION IS OPTIMIZED BY MG DRIVE

Pe: REQUESTED DRIVE POWER

Pg: ENGINE OPERATION REGION IS OPTIMIZED BY MG DRIVE

CONTROL APPARATUS FOR TRANSMISSION-EQUIPPED HYBRID VEHICLE, AND CONTROL METHOD FOR THE SAME

INCORPORATION BY REFERENCE

The disclosure of Japanese Patent Application No. 11-329078 filed on Nov. 19, 1999, including the specification, drawings and abstract is incorporated herein by reference in its entirety.

BACKGROUND OF THE INVENTION

1. Field of the Invention

The invention relates to a control apparatus and a control method for a transmission-equipped hybrid vehicle having an engine, an electric motor, and a transmission. More particularly, the invention relates to a control apparatus and a control method that improve fuel efficiency, emission characteristics, dynamics, etc.

2. Description of Related Art

A hybrid vehicle has an engine and an electric motor as drive power sources. The electric motor is preferably used not only to produce vehicle-driving torque but also as an electric power generator. In this respect, the electric motor is often termed motor-generator. The hybrid vehicle is able to improve fuel economy and the like by efficiently operating the engine and the electric motor.

A mechanical distribution type hybrid vehicle in which an engine and two electric motors are connected to a planetary gear unit has now been commercialized. This type of hybrid vehicle does not have a transmission. In contrast, a hybrid vehicle in which an engine, an electric motor, and a transmission are connected has also been proposed, as disclosed in, for example, Japanese Laid-Open Patent Application No. 8-168104. Systems equipped with continuous transmissions instead of stepwise transmissions (a type of transmission that selects one of a plurality of gear speeds) have also been proposed.

In the aforementioned mechanical distribution type hybrid apparatus, optimization in terms of fuel economy and the like is pursued by controlling the operation states of the engine and the electric motors. However, this type of hybrid apparatus does not have a transmission for selecting from gear speeds.

With regard to a vehicle that is not a hybrid vehicle, speed change characteristics of the automatic transmission are set so as to correspond to the vehicle speed and the amount of accelerator operation. Based on the speed change characteristics, a gear speed of the transmission is determined. A generally termed MMT (multi-mode manual transmission, that is, a transmission system where a clutch pedal is removed and clutch connecting/disconnecting operations are automatically performed by an actuator) also uses the speed change characteristics of the automatic transmission in a similar fashion to determine a gear speed.

A transmission-equipped hybrid vehicle as mentioned above can be constructed by adding to a system in which an engine and a transmission are connected as mentioned above, an electric motor that produces torque to add to the drive power of the engine. However, if the speed change characteristics of an automatic transmission intended only for use with a conventional engine are immediately applied to the transmission-equipped hybrid vehicle although the electric motor is added to the hybrid vehicle, it is impossible to select a gear speed that allows most efficient operation, and it is difficult to perform appropriate controls regarding efficiency, emissions, vehicle dynamics, etc.

SUMMARY OF THE INVENTION

Accordingly, it is one object of the invention to provide a control apparatus and a control method capable of appropriately controlling a hybrid vehicle having a transmission in terms of efficiency, emission characteristics, vehicle dynamics, etc.

To achieve the aforementioned and/or other objects, a control apparatus for a hybrid vehicle in accordance with a first aspect of the invention is for a hybrid vehicle having an engine and a motor as drive power sources and having, between the engine and a drive wheel, a transmission capable of changing drive power transmission by selection from a plurality of gear speeds. In the control apparatus, the priority sequence in a control of adjusting the drive power with respect to a vehicle drive power request is set in the sequence of an engine output increase, a motor output increase, and a gear speed change in a gear ratio increasing direction.

For example, the control apparatus of this aspect of the invention: (1) selects a gear speed of a least gear ratio within such a range that an engine revolution speed higher than or equal to a predetermined lower limit revolution speed is attainable; (2) achieves a requested drive power by an engine output with the gear speed selected; (3) achieves the requested drive power by the engine output and a motor output when the requested drive power is not achievable singly by the engine output; and (4) changes the gear speed in a gear ratio increasing direction when the requested drive power is not achievable by the engine output and the motor output.

In accordance with this aspect of the invention, the requested drive power is achieved by adjusting the engine output, the motor output, and the gear speed in that order. The gear speed change is assigned with a lower priority, and the engine output change is assigned with a higher priority. Therefore, when a drive power request is output, a control is performed so as to set the gear speed to a lower speed and increase the engine output. As a result, the engine is efficiently operated in a low-speed and high-load state, so that fuel economy improves. Furthermore, by setting the aforementioned priority sequence, the number of gear shifts is reduced. Therefore, frequent downshifts are avoided, and drivability improves, and an emission characteristic improves.

The control apparatus of this aspect of the invention may change the gear speed in accordance with a factor that affects a motor control. The factor that affects the motor control is, for example, SOC (state of charge of a battery), battery temperature, inverter temperature, etc. This aspect of the invention is able to secure a stable output supplying capability of the motor, and is able to prevent deteriorations in vehicle dynamics.

Another aspect of the invention provides a control apparatus for a hybrid vehicle having an engine and a motor as drive power sources and having, between the engine and the drive wheel, a transmission capable of changing drive power transmission by selection from a plurality of gear speeds. A gear speed of the transmission and an operation state of the engine are set such that the engine is operated in a predetermined high-efficiency operation state, and a difference between the vehicle drive power requested and an engine output is compensated by one of a drive operation of the motor and a regenerative operation of the motor. A gear speed of a least gear ratio in the transmission may be set within a range such that the engine is operated in the predetermined high-efficiency operation state, and such that the difference between the vehicle drive power requested and the engine output is compensated by one of the drive operation of the motor and the regenerative operation of the motor.

In accordance with this aspect of the invention, selecting an appropriate gear speed causes a high-efficiency operation of the engine, thereby improving fuel economy. The engine may be operated at a maximum efficiency point. Furthermore, by selecting a gear speed of a less gear ratio, improvements can be achieved in fuel economy, emissions, and drivability, as mentioned above.

The predetermined high-efficiency operation state may be a state where a multiplication product of an efficiency of the engine and a transmission efficiency of the transmission maximizes. Therefore, a gear ratio and an engine operation state are set so as to allow a maximum-efficiency operation of the engine and the transmission system as well, so that fuel economy can be improved.

Furthermore, the gear speed of the transmission and the operation state of the engine may be set such that the engine is operated in a predetermined good emission region. Therefore, an improvement can be achieved in emissions.

Still another aspect of the invention provides a control apparatus for a hybrid vehicle having an engine and a motor as vehicle drive power sources and having, between the engine and a drive wheel, a transmission capable of changing drive power transmission by selection from a plurality of gear speeds. When the drive power requested for the vehicle is negative, a gear speed of the transmission is set such that an efficiency of regenerative braking performed by the motor maximizes.

In a hybrid vehicle equipped with a transmission, the efficiency of the motor regenerative braking changes in accordance with the gear speed of the transmission. For example, when the engine is turned following the motor (i.e., when the engine is turned by the motor), selection of a less gear ratio reduces the turning resistance on the side of the engine, and therefore increases the regenerative braking efficiency on the side of the motor. Taking this fact into consideration, the apparatus of this aspect of the invention selects a gear speed such that the efficiency of regenerative braking maximizes. Therefore, improvements can be achieved in fuel economy and emissions.

The gear speed selected may vary in accordance with whether an operation of the engine is stopped or not during a regenerative operation of the motor. This aspect is intended for a construction in which the engine operation can be stopped by a clutch or the like. When the engine is turning, the turning resistance on the side of the engine decreases and the regenerative braking efficiency on the side of the motor increases with decreases in the gear ratio as stated above. When the engine is not turning, the turning resistance on the side of the engine does not need to be taken into consideration, so that a gear speed such that the efficiency on the side of the motor increases is selected. Thus, by selecting different gear speeds in accordance with whether the engine is turning or not, further improvements can be achieved in fuel economy and emissions.

The aspects of the invention are not limited to a control apparatus for a hybrid vehicle as described above. A further aspect of the invention is, for example, a hybrid vehicle or a hybrid system, and a control method for the hybrid vehicle and the hybrid system.

BRIEF DESCRIPTION OF THE DRAWINGS

The foregoing and/or further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

Preferred embodiments of carrying out the invention will be described hereinafter with reference to the accompanying drawings.

Figure 1:
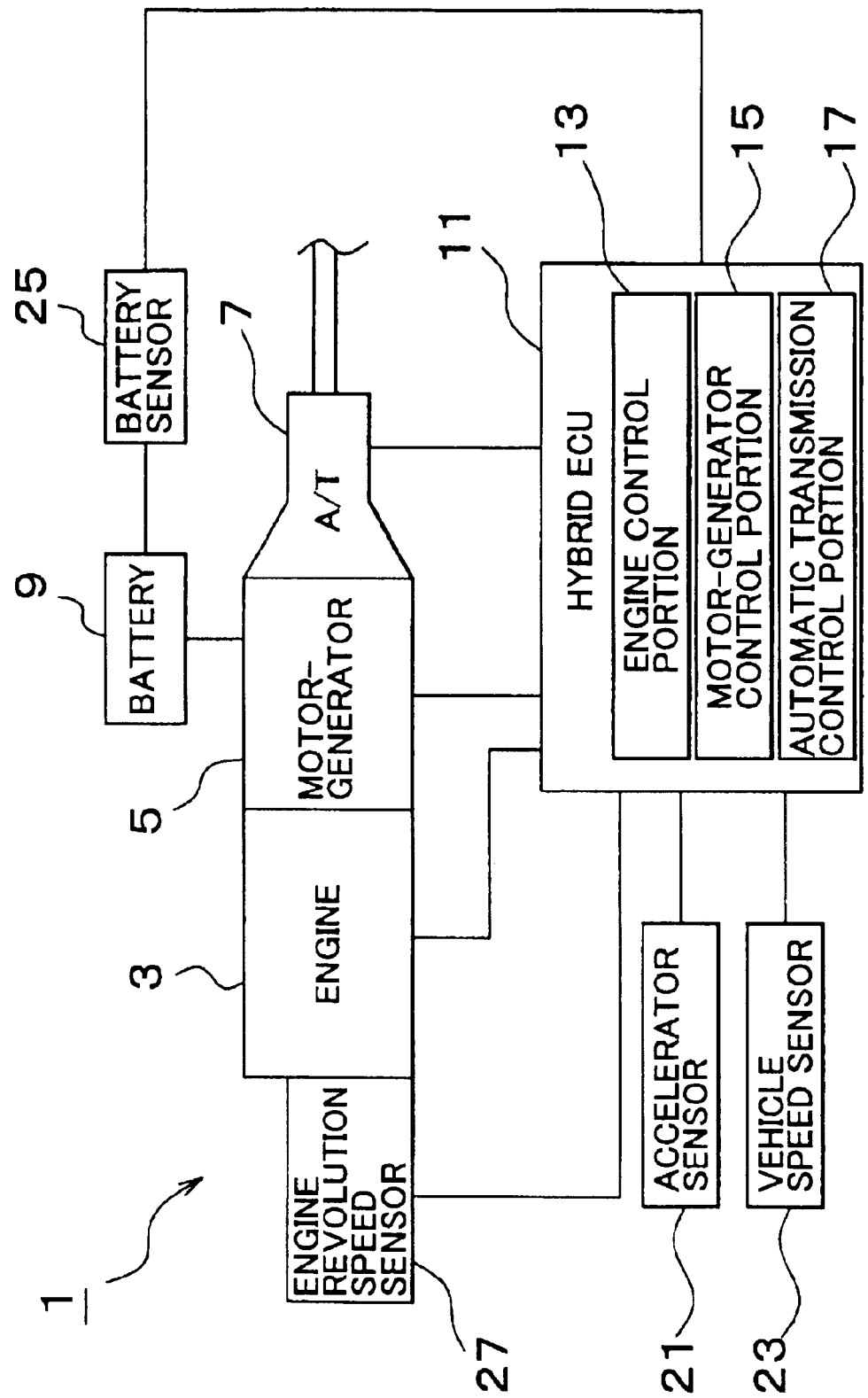
FIG. 1 is a block diagram illustrating an overall construction of a hybrid vehicle in accordance with an embodiment of the invention.

FIG. 1 is a block diagram of a construction of a direct-coupled hybrid vehicle equipped with a transmission. hybrid vehicle 1 has an engine 3 and a motor-generator 5 as drive power sources. The engine 3 and the motor-generator 5 are interconnected. The motor-generator 5 is connected to an automatic transmission 7. The automatic transmission 7 is connected to drive wheels (not shown). The motor-generator 5, when functioning as an electric motor, receives electric power from a battery 9 to produce drive power. When functioning as an electric power generator, the motor-generator 5 is turned by output from the engine to generate electric power, and sends the generated power to the battery 9.

Within the scope of the invention, the motor-generator 5 is not restricted by the layout shown in FIG. 1. For example, the motor-generator 5 may be provided at a drive wheel-side of the automatic transmission 7. Furthermore, the motor-generator 5 may be connected to an engine output shaft or the like, or to an input/output shaft of the transmission or the like, via a clutch.

Still further, a generally termed MMT (multi-mode manual transmission) may be disposed in place of the automatic transmission 7. Unlike a conventional manual transmission, the MMT does not employ a clutch pedal but has an actuator for automatically performing clutch operations for a driving person. Based on mode settings, the MMT automatically determines a gear speed through the use of a control apparatus, as is the case with an automatic transmission. Thus, the invention is applicable not only to automatic transmissions but also to any other transmission in a similar fashion as long as the transmission is capable of selecting a gear speed from a plurality of gear speeds.

The engine 3, the motor-generator 5 and the automatic transmission 7 are controlled by a hybrid ECU 11. The hybrid ECU 11 may be formed by either a single computer or a plurality of computers. For example, an engine control portion 13, a motor-generator control portion 15, and an automatic transmission control portion 17 may be formed by three separate ECUs.

The hybrid ECU 11 receives input of an amount of accelerator operation performed by a driving person from an accelerator sensor 21, input of vehicle speed from a vehicle speed sensor 23, input of engine revolution speed from an engine revolution speed sensor 27, and input of a detection signal indicating a state of charge of the battery from a battery sensor 25. Using such input information, the hybrid ECU 11 appropriately operates the engine 3, the motor-generator 5, and the automatic transmission 7 based on the running state of the vehicle, the operation performed by the driving person, and the state of charge of the battery.

Let it be assumed herein that the system shown in FIG. 1 is not provided with a motor-generator. In this case, controls may be performed as in a conventional automatic transmission-equipped vehicle that is not a hybrid vehicle. That is, a speed change map set in accordance with the vehicle speed and the amount of accelerator operation is pre-stored. In accordance with the speed change map, a gear speed is determined, and the transmission is controlled.

In this embodiment, a motor-generator as a torque assist device is added. Therefore, if the automatic transmission is controlled through the use of a conventional speed change map, high-efficiency operation of the hybrid vehicle cannot be performed. For example, let it be assumed that the driving person suddenly depresses an accelerator pedal so that a considerable increase in the vehicle drive power is requested. In this case, it is conceivable to increase the motor output or perform a downshift of gears in the construction shown in FIG. 1. In this invention, a drive power control is performed by adjusting and controlling the engine 3, the motor-generator 5, and the automatic transmission 7 corresponding to the requested drive power of the vehicle. In this embodiment, a drive power control as described below is performed by the hybrid ECU 11.

Figure 2:
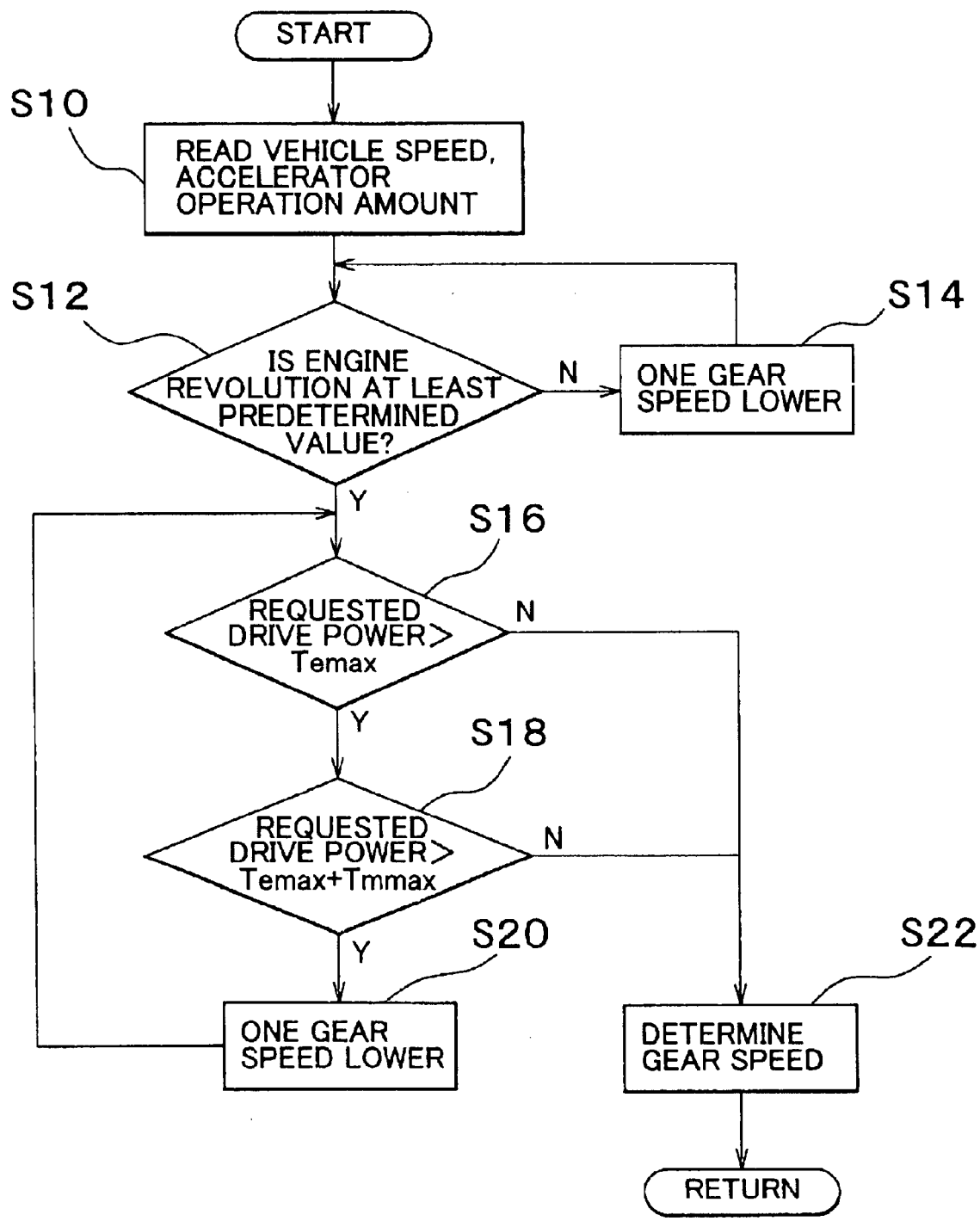
FIG. 2 is a flowchart illustrating a control process executed by a hybrid ECU shown in FIG. 1.

Referring to FIG. 2, the hybrid ECU 11 reads a vehicle speed and an accelerator operation amount in S10, and then selects a gear speed (for a high speed) of a least gear ratio that allows at least a predetermined value of engine revolution speed in S12 and S14. The predetermined value (engine revolution speed lower limit) is set to a low value within a range in which engine torque fluctuation does not adversely affect the vehicle behavior, vibration, etc. For example, the predetermined value is set to about 1200 rpm. More specifically, it is determined in S12 whether the engine revolution speed is at least the predetermined value. If NO in S12, the gear speed is shifted to the next gear speed toward the low speed (in a gear ratio increasing direction) in S14. The process then returns to S12. If YES in S12, the process proceeds to S16. The gear speed set in S12 and S14 will be referred to as "provisionally set gear speed".

In S16, it is determined whether a requested drive power can be achieved singly by engine output. The requested drive power is determined based on the accelerator operation amount and the vehicle speed. In this flowchart, the vehicle speed read in S10 and the provisionally set gear speed set in S12 and S14 are used to determine an engine revolution speed occurring when the provisionally set gear speed is adopted. Then, a maximum engine torque Temax corresponding to the engine revolution speed is determined. The value Temax is obtained by conversion into torque that acts on a drive shaft.

In this embodiment, the maximum engine torque Temax is set to a value at which the engine energy efficiency maximizes. That is, if the engine torque is increased while a certain engine revolution is maintained, the energy efficiency gradually increases to a maximum. If the engine torque is further increased, the energy efficiency decreases. The value Temax is set to this maximum point.

In S16, the requested drive power is compared with the value Temax. If the value Temax is greater than or equal to the requested drive power, the requested drive power can be achieved singly by engine output. That is, if the determination in S16 is negative, the process proceeds to S22, in which a gear speed is determined. The gear speed selected in S12 and S14 is adopted without changing it. Then, the hybrid ECU 11 causes the engine 3 to produce the requested drive power.

If the requested drive power cannot be achieved singly by engine output, the determination in S16 becomes affirmative. Subsequently in S18, it is determined whether the requested drive power can be achieved by engine output and motor output. In this step, the engine revolution speed occurring when the provisionally set gear speed is determined, and a maximum motor torque Tmmax is determined. The value Tmmax is also a value obtained by conversion into torque that acts on the drive shaft.

In S18, the requested drive power is compared with Temax+Tmmax. If Temax+Tmmax is greater than or equal to the requested drive power, the requested drive power can be achieved by engine output and motor output. That is, if the determination in S18 is negative, the process proceeds to S22, in which a gear speed is determined. The gear speed selected in S12 and S14 is adopted without changing it. Then, the hybrid ECU 11 causes the engine 3 and the motor-generator 5 to produce the requested drive power. In this step, the hybrid ECU 11 causes the engine 3 to produce the maximum torque Temax, and causes the motor-generator 5 to produce a drive power that cannot be covered by the maximum torque of the engine 3, that is, a drive power equal to the shortfall from the requested drive power.

If the requested drive power cannot be achieved even by the combination of engine output and motor output, the determination in S18 becomes affirmative. The process subsequently proceeds to S20, in which the gear speed is changed to the next gear speed toward the low gear side (toward the gear ratio increasing side). That is, in S20, the provisionally set gear speed set in S12 and S14 is changed by one gear speed. Subsequently, the process proceeds to step S16 to repeat similar processing.

As can be understood from the foregoing description, a priority sequence in the drive power adjusting control is determined as in the sequence of engine output, motor output, and gear speed, in this embodiment. The requested drive power is achieved through adjustment in accordance with the priority sequence. More specifically, a gear speed of a smallest possible gear ratio is provisionally set. If the requested drive power can be provided by engine output with the provisionally set gear speed, engine output is used. If the requested drive power is higher, torque assist by the electric motor is performed. If the requested drive power is even higher, the transmission is shifted to a lower-speed gear.

Through this control, the gear speed is set to a lower speed, and the engine torque is set to a higher value. Therefore, the engine can be highly efficiently operated in a low-speed and high-load state, thereby improving fuel economy.

Furthermore, until the motor torque reaches a maximum, the requested drive power is achieved through torque assist by the motor without a downshift of the gear speed. Therefore, frequent downshifts are avoided, so that drivability can be improved. Still further, if the number of downshifts is small, the influence of sharp changes in engine revolution speed due to downshifts on emissions (problem in the AF controllability) can be reduced, so that an improvement can be achieved in emissions.

Next, a preferred control process executed by the hybrid ECU 11 in this embodiment will be described. In this process, the hybrid ECU 11 changes the transmission speed based on factors that affect the motor control and, in particular, a factor that has effect on the amount of torque assist provided by the motor-generator 5.

The factors having effect on the amount of torque assist include, for example, SOC (state of charge of a battery), battery temperature, inverter temperature, etc. It is to be noted that, depending on the values of these parameters, the torque that can be supplied from the side of the motor increases or decreases. Taking such changes in the torque, a gear speed of the transmission is set in this embodiment.

Figure 3:
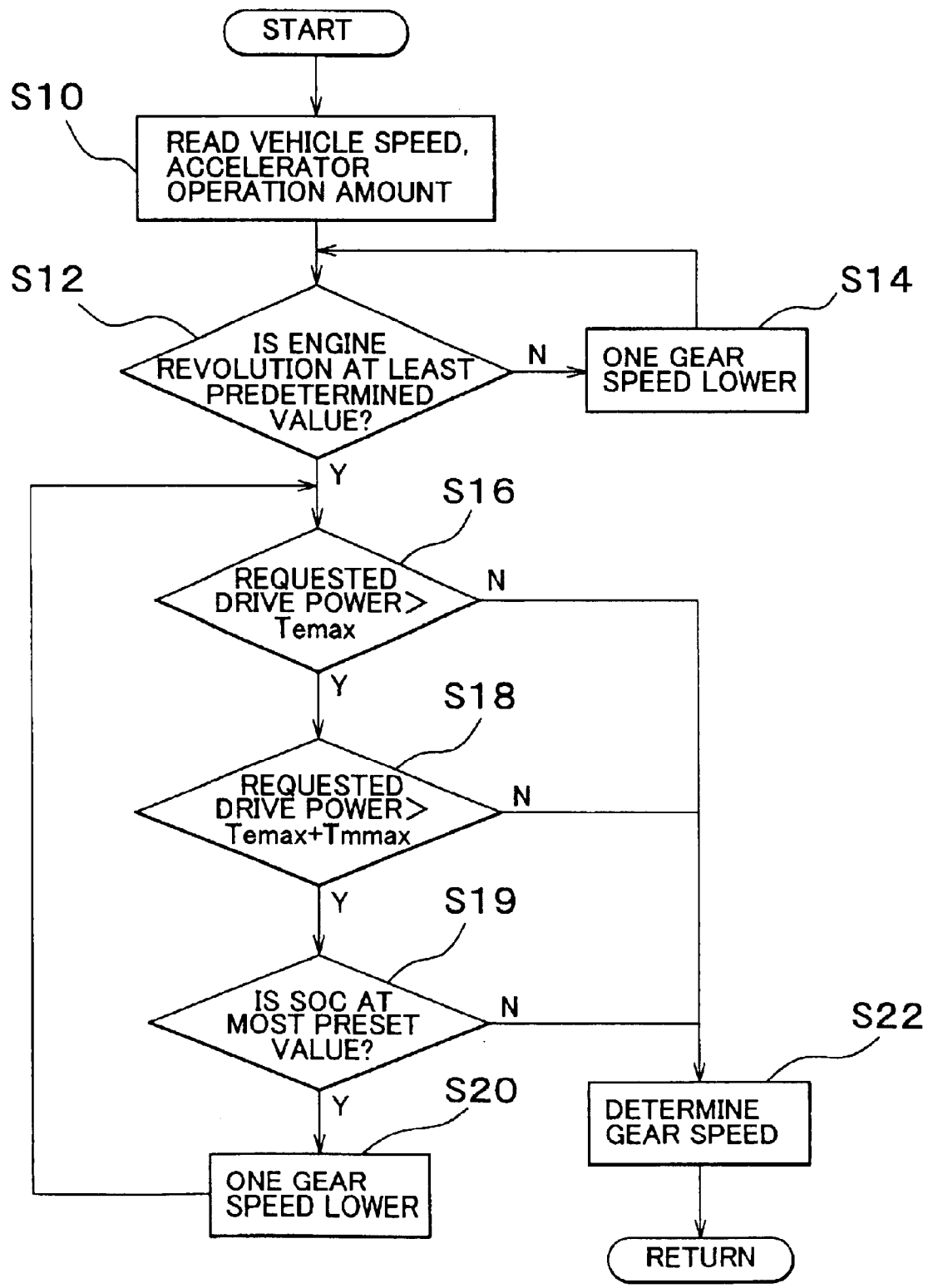
FIG. 3 is a flowchart illustrating a second embodiment of the control process executed by the hybrid ECU shown in FIG. 1.

FIG. 3 illustrates a control process in accordance with this embodiment, wherein SOC is used as a factor that affects the amount of torque assist. The process illustrated in FIG. 3 includes the control process illustrated in FIG. 2, and also S19 following S18. In S19, the SOC of the battery is determined. The SOC is expressed by, for example, the ratio of the amount of electricity stored at the time of performance of this control process to the amount of electricity stored in a full storage state. The SOC is determined by using battery voltage and current and, preferably, by also using battery temperature as needed. It is also possible to input an SOC determined by a separate battery ECU or the like into the hybrid ECU.

In S19, the SOC at the time of performance of this control process is compared with a preset value. If the SOC is at most the preset value (i.e., if the SOC is equal to or less than the preset value), the process proceeds to S20, in which the gear speed is changed to the next speed toward the low speed side. If it is determined in S19 that the SOC is greater than the preset value, the process proceeds to S22, in which the gear speed is determined.

Thus, this embodiment sets a gear speed based on a factor that has effect on the amount of torque assist or the torque assist capability of the motor-generator 5. Therefore, it becomes possible to secure a stable assist torque supplying capability and prevent a reduction in vehicle dynamics caused by an insufficient torque. Furthermore, it becomes possible to prevent deterioration of the battery or the like.

Another embodiment of the invention will next be described. In this embodiment, the constructions of a hybrid vehicle and its control apparatus may be substantially the same as those in the first embodiment. In the second embodiment, the control process executed by the hybrid ECU 11 is improved, so that efficiency and fuel economy can be further improved.

In this embodiment, the hybrid ECU 11 selects a gear speed of a least gear ratio (a higher gear speed) within such a range that the requested drive power can be achieved by engine output and motor output while the present vehicle speed is maintained. Then, with the selected gear speed, the engine is operated in a predetermined high-efficiency operating state. The difference between the engine output and the requested drive power is compensated by drive power assist based on an electric power consuming movement (driving) of the motor, or, in the case of a surplus of power (from the engine), is regenerated into an electric power by electric power regenerating operation of the motor.

Figure 4:
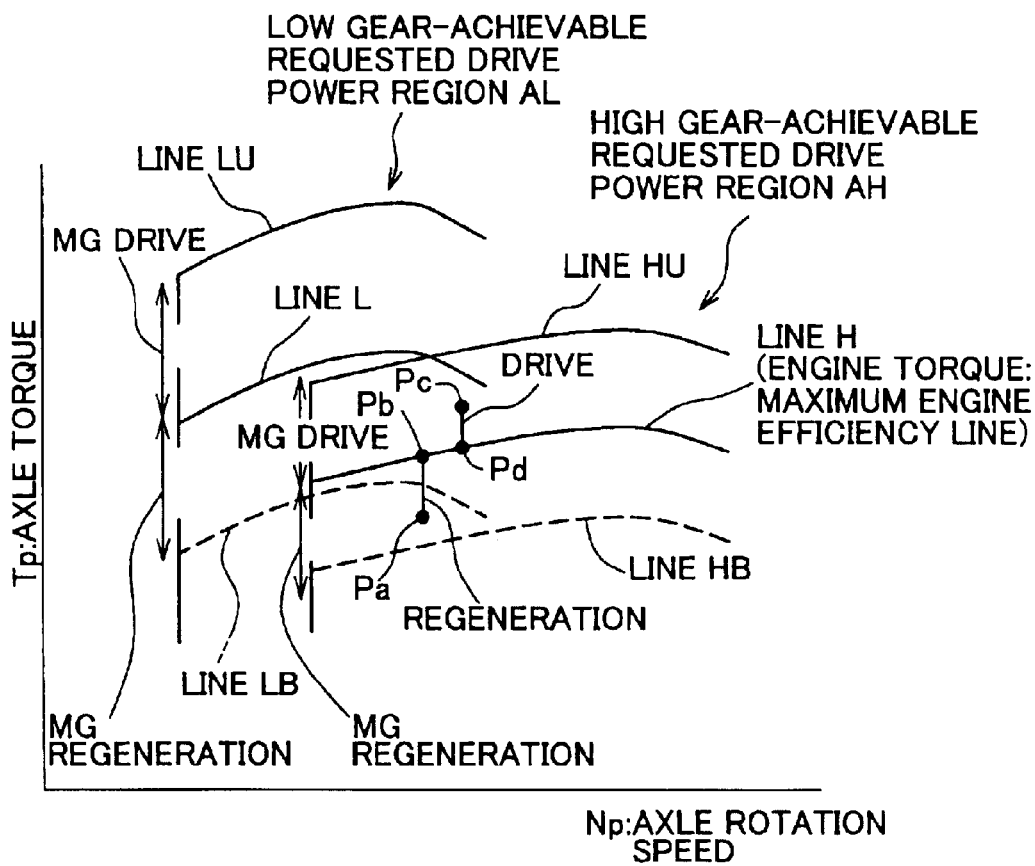
FIG. 4 is a diagram indicating a control process of a hybrid vehicle in accordance with another embodiment of the invention.

FIG. 4 is a diagram indicating a specific example of the control process in this embodiment, in which the horizontal axis indicates axle rotation speed Np and the vertical axis indicates axle torque Tp. In the diagram, a requested drive power region AL achievable by a low gear and a requested drive power region AH achievable by a high gear are indicated.

In the region AL, a central line L indicates engine torque (converted into axle torque; the same applies in the following description) produced when the engine is operated at a maximum efficiency with the low gear being set. A region upper limit line LU is located higher than the line L by a maximum value of motor drive torque. A region lower limit line LB is located lower than the line L by a maximum value of motor regenerative torque. In this embodiment, the region AL is defined as a range such that the requested drive power can be achieved with the low gear. In the high gear-achievable requested drive power region AH, a central line H indicates engine torques produced when the engine is operated at a maximum efficiency with the high gear being set. A region upper limit line HU is located higher than the line H by a maximum value of motor drive torque. A region lower limit line HB is located lower than the line H by a maximum value of motor regenerative torque. It should be noted herein that the region AH of the high gear and the region AL of the low gear have different shapes and positions corresponding to their different gear ratios.

In the example indicated in FIG. 4, the hybrid ECU 11 controls the transmission, the engine, and the motor as follows. That is, as described above, the hybrid ECU 11 selects a gear speed of a least gear ratio within the range such that the requested drive power can be achieved by engine output (maximum-efficiency operation) and motor output at the present vehicle speed.

For example, let it be assumed that the combination of the requested drive power and the axle rotation speed (vehicle speed) is at a point Pa in FIG. 4. In this case, the point Pa is contained only in the high gear-achievable requested drive power range AH. Therefore, the high gear is selected.

Furthermore, let it be assumed that the combination of the requested drive power and the axle rotation speed is at a point Pc in FIG. 4. In this case, the point PC belongs to both the region AL and the region AH, so that either gear can be selected. The hybrid ECU 11 selects the gear speed of the less gear ratio, that is, the high gear.

The aforementioned gear speed selecting process can be expressed by using expression (1):

$$Te\max(i, v) - Tm \text{ regenerative max}(i, v) \leq \text{requested drive power} \leq Te\max(i, v) + Tm \text{ drive max}(i, v) \quad (1)$$

Temax (i, v) is a torque (converted into an axle torque; the same applies hereinafter) produced during the maximum-efficiency operating state of the engine at the gear speed i and the vehicle speed v. Tm regenerative max (i, v) and Tm drive max (i, v) are a maximum value of regenerative torque and a maximum value of drive torque at the gear speed i and the vehicle speed v (however, if the motor is provided at the wheel side of the transmission, the motor torque is not affected by the gear ratio). In this embodiment, a gear speed i of a least gear ratio that satisfies expression (1) is selected.

The flow of the gear selecting process may be substantially the same as the flow illustrated in FIG. 2. That is, based on the vehicle speed, a gear speed of a least gear ratio that provides an engine revolution speed that is higher than or equal to a predetermined lower-limit revolution speed is provisionally set. If expression (1) is satisfied at the provisionally set gear speed, the gear speed is immediately adopted. If the expression is not satisfied, the gear speed is changed to the next gear speed toward the low speed side. This process is continued until expression (1) is satisfied. As a result, a highest gear speed that allows for the requested drive power is selected.

Although in the example indicated in FIG. 4, the number of gear speeds is two, a similar gear selecting process is applicable to a transmission having more than two gear speeds.

An engine control and a motor control at the selected gear speed will next be described. In this embodiment, the engine is operated in a high-efficiency operating state, and the difference between the engine output and the requested drive power is compensated by the drive operation of the motor or the regenerative operation of the motor as mentioned above.

For a specific description, let it be assumed that the combination of the requested drive power and the axle rotation speed is at a point Pa in the example of FIG. 4. In this case, the engine is operated at a point Pb on the line H. The line H indicates torques output during the maximum-efficiency operating state of the engine with the high gear, as mentioned above. Since the engine output is greater than the requested drive power, the difference therebetween is absorbed by the regenerative operation of the motor. The electric power obtained by the regeneration is stored into the battery.

Furthermore, let it be assumed that the combination of the requested drive power and the axle rotation speed is at a point Pc in FIG. 4. In this case, the engine is operated at a point Pd on the line H. Since the engine output is less than the requested drive power, the shortfall from the requested drive power is compensated by the drive operation of the motor. In this case, electric power is extracted from the battery.

As is apparent from the foregoing description, this embodiment selects an engine operation region and a gear speed so as to maximize the engine efficiency with the aid of the regenerative operation of the motor-generator or the drive operation of the motor-generator. Therefore, the embodiment is able to operate the engine at high efficiency and improve fuel economy.

A modification of the foregoing embodiment will be described. In the foregoing embodiment, an engine operation region and a gear speed are selected such that the engine is operated at a maximum efficiency. In this modification, an engine operation region and a gear speed are selected such that the multiplication product of the engine efficiency and the transmission rate of the transmission apparatus maximizes.

In the example indicated in FIG. 4, the line H prescribes the output torque during the maximum-efficiency operating state of the engine. Instead of the line H, a line where the "engine efficiency×transmission rate of the transmission apparatus" maximizes is used in this modification. The transmission rate of the transmission apparatus is determined in accordance with the gear speed and the axle rotation speed.

This embodiment is able to achieve maximum-efficiency operation of not only the engine but also the transmission system, and therefore allow a further improvement in fuel economy.

Another modification of the embodiment will be described. In this modification, an engine operation region and a gear speed are selected such that the emission characteristic is optimized. That is, taking it into consideration that emissions vary depending on the engine operation region, an operation region is selected such that the emission characteristic becomes good.

Figure 5:
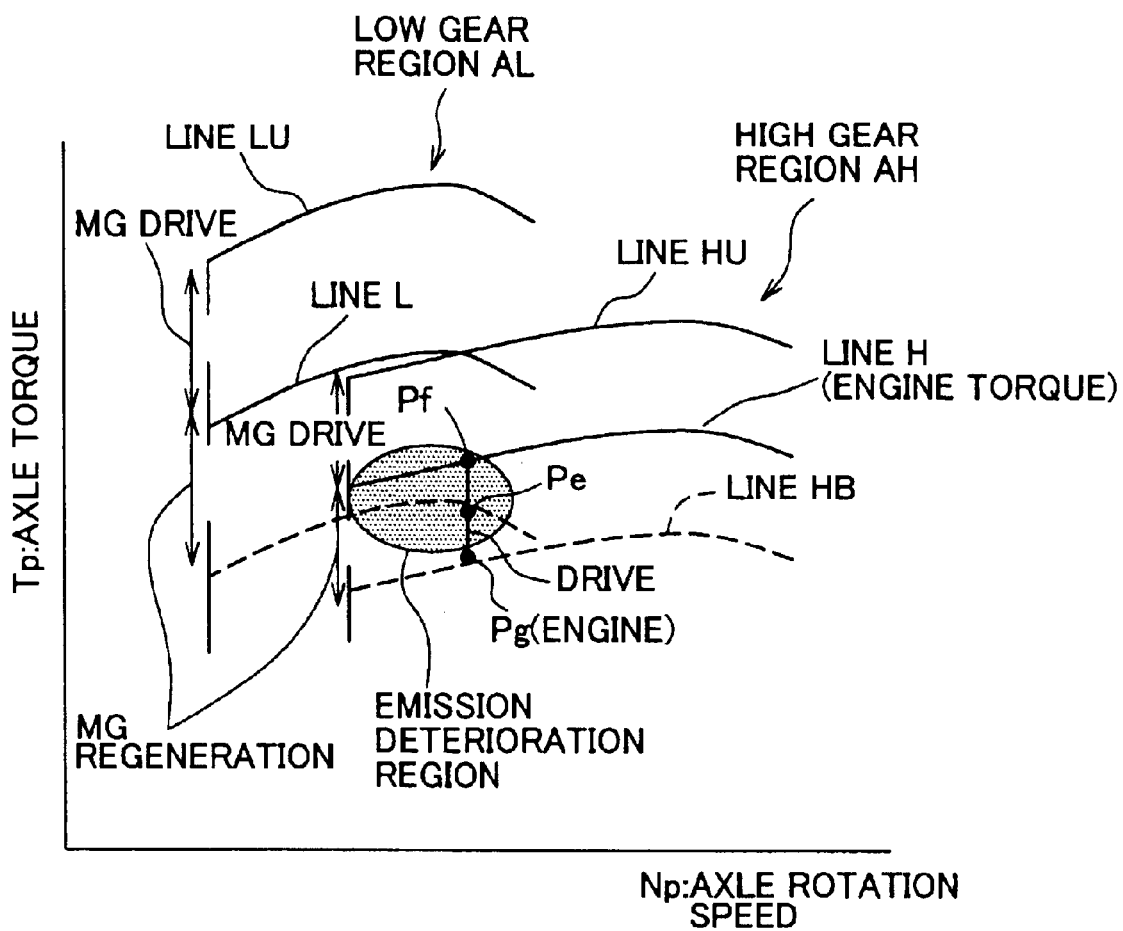
FIG. 5 is a diagram indicating a modification of the control process illustrated in FIG. 4.

In a specific example indicated in FIG. 5, the engine of the hybrid vehicle is assumed to be a diesel engine. As indicated in FIG. 5, in a low-speed and high-load region of a diesel engine, there is a region where the emission characteristic is bad in extracting a portion of exhaust gas from the exhaust system of the engine and returning the portion of exhaust gas to the intake system. Therefore, this region is avoided in selecting an engine operation region and a gear speed.

For example, let it be assumed that the combination of the axle rotation speed and the requested drive power is at a point Pe in FIG. 5. If the engine is operated at a maximum-efficiency point (Pf on the line H), the operation point enters the emission deterioration region. To avoid this, a point Pg indicated in the diagram is selected as an operation region. In this case, the engine output is insufficient for the requested drive power, so that the amount of shortfall is compensated by motor output (drive).

As is apparent from the foregoing description, this embodiment sets a gear speed of the transmission and an operation region of the engine so as to avoid the emission deterioration region, that is, so that the engine is operated in a good emission region. Therefore, the emission characteristic can be improved.

While controls performed in a case where the requested drive power is mainly positive have been described above, a preferable control in a case where the requested drive power is negative will be described below.

When the requested drive power is negative, regenerative braking is basically performed by the motor-generator, and the obtained electric power is stored into the battery. The invention is intended for a transmission-equipped hybrid vehicle. When the requested drive power is negative, the invention sets a gear speed on the side of the transmission so that the efficiency of the regenerative braking on the side of the motor maximizes.

Figure 6:
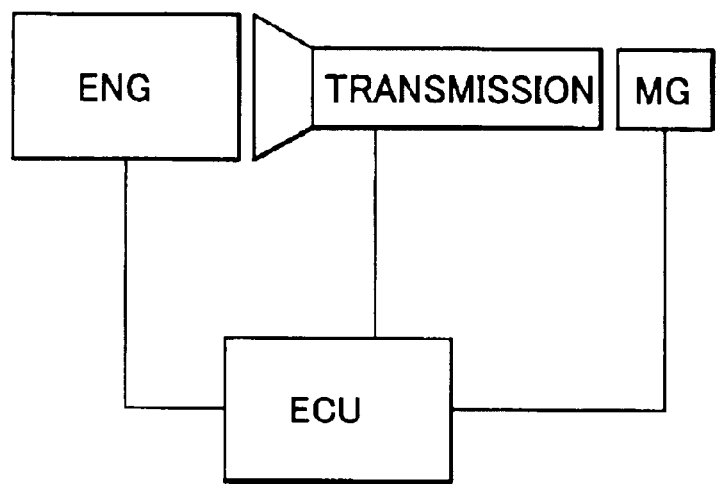
FIG. 6 is a diagram of a hybrid vehicle for illustrating a control process executed when the requested drive power for the vehicle is negative.

For example, a hybrid vehicle having a construction as illustrated in FIG. 6 will be considered. A transmission is connected to an engine. A motor-generator is connected between the transmission and wheels. The motor-generator is directly connected to an output shaft of the transmission.

In this case, the engine is turned following the motor (i.e., turned by the motor) during regenerative braking. Friction of the engine (turning resistance) becomes a factor that reduces the regenerative braking efficiency. Therefore, this control apparatus of the hybrid vehicle selects a gear speed of a least gear ratio (highest gear speed) for regenerative braking, and causes the transmission to perform a shift to the selected gear speed.

Through this control, the gear ratio is reduced, so that the friction loss caused on the motor-generator by the engine via the transmission minimizes and, therefore, the efficiency of regenerative braking increases.

Thus, when the requested drive power is negative, this embodiment selects a gear speed in the transmission that maximizes the regeneration efficiency, so that fuel economy and emission characteristic can be improved.

Next, a second example of the transmission control performed when the requested drive power is negative will be described. A hybrid vehicle designed so as to be able to stop engine revolution is assumed herein. This embodiment selects a gear speed at which the regeneration efficiency maximizes. The optimal gear speed set varies depending on whether to stop engine operation.

Figure 7:
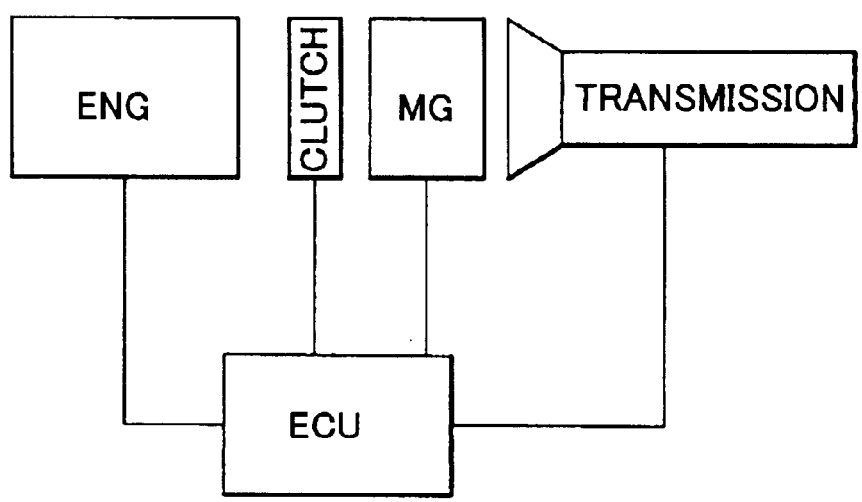
FIG. 7 is a diagram of a hybrid vehicle for illustrating still another example of the control process executed when the requested drive power with respect to the vehicle is negative.

This embodiment is applied to, for example, a control apparatus for a hybrid vehicle as illustrated in FIG. 7. A motor-generator is disposed between an engine and a transmission. A clutch is interposed between a rotating shaft of the motor and a rotating shaft of the engine.

When the requested drive power is negative, the control apparatus determines whether the engine is turning or is stopped. If the clutch is connected, the engine is operating in a fuel-cut state. Conversely, if the clutch is disconnected, the engine is stopped.

When the engine is operating, the control apparatus selects a gear speed of a least gear ratio. Therefore, the amount of engine turning resistance transmitted decreases, and the efficiency of regenerative braking increases. Conversely, when the engine is stopped, a gear speed that maximizes the efficiency of the motor-generator is selected. If the engine is stopped, there is no effect caused by engine turning resistance. Therefore, the aforementioned gear speed selection maximizes the efficiency of regenerative braking. The control apparatus controls the shift to the gear speed selected as described above. Furthermore, the control apparatus causes the motor-generator to perform regenerative braking.

Thus, this embodiment sets a different gear speed depending on whether to operate or stop the engine, so that the efficiency of regenerative braking can be increased in both modes. Therefore, fuel economy and emission characteristic can be improved.

As is apparent from the foregoing embodiment, the invention makes it possible to select an appropriate gear speed at which the engine and the motor can be efficiency operated in a transmission-equipped hybrid vehicle. Therefore, improvements can be achieved in efficiency, emissions, vehicle dynamics, etc.

In the illustrated embodiment, the controller (hybrid ECU 11) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control apparatus for a hybrid vehicle having an engine and a motor as drive power sources, and having a transmission that is disposed between the engine and a vehicle drive wheel and that changes drive power transmission by selection from a plurality of gear speeds, the control apparatus comprising:
  a controller that detects a drive power requested for the vehicle drive wheel and that adjusts the drive power by setting an engine output increase, a motor output increase, and a gear speed change by increasing a gear ratio, in an order of descending priorities of: (1) the engine output increase, (2) the motor output increase, and (3) the gear speed change by increasing the gear ratio, so as to achieve the drive power requested; wherein the controller
  (a) initially selects a gear speed of a low gear ratio within a range such that an engine revolution speed higher than or equal to a predetermined lower limit revolution speed is attainable;
  (b) achieves the requested drive power singly by the engine output with the gear speed selected; otherwise
  (c) achieves the requested drive power by the engine output and motor output when the requested drive power is not achievable singly by the engine output; otherwise
  (d) changes the year speed by increasing a gear ratio when the requested drive power is not achievable by the engine output and the motor output.

2. A control apparatus according to claim 1, wherein the controller change the gear speed in accordance with a factor that affects a motor control.

3. A control apparatus according to claim 2, wherein the controller changes the gear speed based on at least one of a state of charge of a battery, a battery temperature, and an inverter temperature, which are factors that affect the motor control.

4. A control apparatus according to claim 1, wherein the controller detects the requested vehicle drive power based on a vehicle speed and an amount of operation of an accelerator.

5. A control method for a hybrid vehicle having an engine and a motor as drive power sources, and having a transmission that is disposed between the engine and a vehicle drive wheel and that changes drive power transmission by selection from a plurality of gear speeds, the control method comprising:
  detecting a drive power requested for the drive wheel; and
  adjusting the drive power by setting an engine output increase, a motor output increase, and a gear speed change by increasing a gear ratio, in an order of descending priorities of: (1) the engine output increase, (2) the motor output increase, and (3) the gear speed change by increasing the gear ratio, so as to achieve the drive power requested, wherein the drive power adjusting step includes the steps of:
  initially selecting a gear speed of a low gear ratio within a range such that an engine revolution speed hither than or equal to a predetermined lower limit revolution speed is attainable;
  achieving a requested drive power singly by an engine output with the gear speed selected; otherwise
  achieving the requested drive power by the engine output and a motor output when the requested drive power is not achievable singly by the engine output; otherwise
  changing the gear speed by increasing a gear ratio when the requested drive power is not achievable by the engine output and the motor output.

* * * * *